3,431,307
RECOVERY OF CATALYST REACTION CONTROL DILUENT UTILIZED IN THE PREPARATION OF MONOVINYL ACETYLENE
Alfred Peter Kottenhahn, Louisville, Ky., assignor to E. I. du Pont de Nemours and Company, Wilmington, Del., a corporation of Delaware
No Drawing. Filed Apr. 11, 1967, Ser. No. 629,884
U.S. Cl. 260—612   3 Claims
Int. Cl. C07c 41/12, 43/12, 43/04

ABSTRACT OF THE DISCLOSURE

Method of recovering catalyst reaction control diluent, such as diphenyl ether, from the immiscible reaction control diluent phase resulting from the anhydrous preparation of monovinylacetylene; this recovery is achieved by diluting said diluent phase with a low boiling aliphatic hydrocarbon to precipitate tar followed by separating and recovering said reaction control diluent.

BACKGROUND OF THE INVENTION

In the anhydrous preparation of monovinylacetylene from acetylene, it has been found significantly advantageous to utilize a reaction control diluent, such as diphenyl ether, in the anhydrous catalysts system represented by U.S. Patents 2,857,435; 2,934,576; 3,147,312; and 3,142,711. For continuous operation and efficiency, such a diluent must be substantially recovered and recycled into the catalyst system.

It has been discovered that the reaction control diluent, such as diphenyl ether, may be substantially recovered from a spent anhydrous cuprous chloride catalyst system utilized for dimerizing acetylene to monovinylacetylene, in which process the immiscible reaction control diluent phase containing tarry by-products is separated and diluted with a low-boiling alicyclic or aliphatic hydrocarbon, such as pentane, to substantially precipitate said tar, then recovering the diluent/hydrocarbon phase from said tar followed by separating said diluent from said hydrocarbon.

Typical anhydrous processes for the manufacture of monovinylacetylene (MVA) from acetylene utilizing anhydrous cuprous chloride catalyst compositions in a water miscible amide solvent such as dimethyl formamide (DMF) are found in U.S. Patents 2,875,258; 3,142,711; and 3,147,312. The equipment and apparatus utilized is well within the scope of those skilled in the art; selection and instrumentation can be routinely carried out and operating conditions varied in accordance with the make up of the particular composition being treated.

The preferred low boiling hydrocarbon for practicing this invention is pentane; this hydrocarbon functions as a tar precipitating agent and has a boiling point lower than that of the diluent utilized. The temperature during recovery must be maintained above the freezing point of the reaction control diluent such as diphenyl ether.

The ratio of tar precipitant to reaction control diluent may be varied. With the preferred hydrocarbon pentane, a ratio of pentane to diluent that is preferred is about 2:1 to 0.5:1. This ratio gives a residual tar within the range of 0.1% to 3.4%.

Representative examples illustrating the present invention follow.

Example I (A) A two-liter, four-necked, round-bottom flask with bottom outlet (closed) was equipped with a thermometer and a paddle agitator and charged at room temperature with 400 ml. (425 g.) of tarred diphenyl ether diluent (5.8% tar). To the agitated diluent was added slowly 600 ml. (375 g.) n-pentane (technical grade). The mixture was stirred vigorously for about two minutes and then allowed to settle without agitation for about 30 minutes. The precipitated tar phase was drained through the bottom outlet and weighed 87 g. The supernatant phase weighed 700 g. A 393 g. portion was transferred to a one-liter, round-bottom flask equipped with a thermometer, Claisen head and condenser, and immersed in a hot water bath. Pentane was distilled from the mixture under approximately 200 mm. Hg vacuum, the pot temperature was raised gradually to 80° and held there for one hour. In this way 197 g. of diluent containing 0.7% tar was recovered.

(B) In a series of experiments under conditions similar to (A) a more highly tarred diphenyl ether diluent phase (15% tar) was used and the pentane-to-diluent volume ratio varied. The residual tar contents in the recovered diluent were as follows:

| Pentane/diluent volume ratio: | Percent tar in recovered diluent |
|---|---|
| 2 | 0.1 |
| 1 | 1.2 |
| 0.5 | 3.4 |
| 0.25 | 8.9 |

Example II

A thick-walled glass centrifuge bottle (100 ml.) was cooled in an ice acetone bath and charged with about 20 ml. liquid butane (plant grade, 85% butane) and 20 ml. (21.4 g.) of tarred diphenyl ether diluent (7.4% tar), sealed and warmed to room temperature. After shaking and settling the mixture, a dark bottom tar layer was observed under a light brown butane diluent phase. The pressure was released, the supernatant phase was decanted and butane removed by evaporation. The light brown color of the recovered diluent indicated a low tar content.

Example III

A 125 ml. (83 g.) portion of hexane and 250 ml. (259 g.) of tarred diphenyl ether diluent (7.4% tar) were mixed thoroughly and the mixture allowed to settle for about one hour. After decantation of the supernatant phase, the tar precipitate weighed 32 g.

Example IV (A) A 500 ml., three-necked, round-bottom flask with paddle agitator was charged with 200 ml. (155 g.) of cyclohexane. To the stirred cyclohexane was added 100 ml. (107.5 g.) of tarred diphenyl ether diluent (6.0% tar), the mixture was stirred for five minutes, then settled for 15 minutes. After decanting the supernatant phase, the precipitated tar phase weighed 15.7 g.

(B) In another experiment with the same conditions and volumes of materials, isopentane (technical grade) was used as tar precipitant. The tar precipitate weighed 25.6 g. In another experiment with the same conditions and volumes of materials, pentane (technical grade) was used as tar precipitant. The tar precipitate weighed 140 g.

Example V

Monovinylacetylene was prepared from acetylene using anhydrous cuprous chloride catalyst containing diphenyl ether as the reaction control diluent; diphenyl ether diluent was withdrawn; 300 gallons of said diluent containing about 6.1% tar was pumped into 525 gallons of well stirred pentane contained in a 1,000-gallon kettle equipped with a mechanical agitator and a baffle plate. The mixture was agitated for one-half hour, and then settled for one hour. The precipitated tar phase (145 gallons) was drawn from the bottom of the kettle, and the supernatant phase (680 gallons) was charged to a batch still. Pentane was distilled off first at atmospheric pressure (pot temperature up to 100°), then under vacuum (~ 23″ Hg, pot temperature up to 106°). The pot residue constituting the recovered diluent was cooled and discharged and amounted to 200 gallons containing 0.6% tar. This recovered diluent is recycled to the monovinylacetylene reactor.

In the preceding representative examples, the invention process has been illustrated with pentane, butane, hexane, pentene, cyclohexane and isopentane as low boiling alicyclic or aliphatic hydrocarbons which may be utilized on a substantially equivalent basis. The ratio of hydrocarbon to reaction control diluent may vary, to achieve the most desirable results, within the range of about 2:1 to 0.5:1 to give a residual tar percentage within the range of about 0.1% to about 3.4%.

In the practice of this invention, the anhydrous cuprous chloride catalyst system through which acetylene is passed may be one in which a reaction control diluent, such as diphenyl ether, is incorporated, said diluent forming an immiscible phase in said catalyst system and resulting in numerous technical benefits. For example, production flexibility is maintained, that is complex control problems avoided as is a high rate of by-product formation. The reaction control diluent achieves a practical degree of tar solvency, high yield of monovinyl acetylene, a high conversion of acetylene and permits more catalyst flexibility. Improved catalyst performance and life is achieved. Improved mass transfer properties are achieved as is greater safety as the high-boiling reaction control diluent maintains the interior of the reactor in a wet state making it more difficult for reactor deposits to dry out.

The high-boiling reaction control diluent is selected from the class of hydrocarbon ethers having the formula R—O—R' wherein R and/or R' are alkyl, cycloalkyl, aralkyl of aryl radicals optionally substituted with halogen or alkyl groups. Said diluent should boil above 100° C., preferably above 150° C. and most preferably above 200° C. The melting point of the pure reaction control diluent must be at or below the catalyst system reaction temperatures.

Specific representaive reaction control diluents include the following: dihexyl ether; diphenyl ether; benzyl-n-butyl ether; p-chlorophenyl methyl ether; p-tert. butylphenyl methyl ether; p-tert. butylphenyl ethyl ether; p-tert. butylphenyl isopropyl ether; p-tert. butylphenyl benzyl ether and dibenzyl ether.

In general, 1.5 mole of monomethyl amine·hydrochloride per mole of cuprous chloride ($Cu_2Cl_2$) catalyst is utilized in the monovinyl acetylene reactor wih 25% dimethyl formamide to form a 40 volume percent catalyst phase with 60 volume percent reaction control diluent.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. The process of recovering a reaction control diluent, boiling above 100° C. and having the formula R—O—R' wherein said R and R' are individually selected from the group consisting of alkyl, cycloalkyl, aralkyl, or aryl radicals optionally substituted with halogen or alkyl groups, from a spent, essentially anhydrous cuprous chloride catalyst which has been used for dimerizing acetylene to monovinylacetylene wherein the resulting immiscible reaction control diluent phase containing tarry by-products is diluted with a tar precipitating amount of a low boiling hydrocarbon selected from the group consisting of alicyclic and aliphatic hydrocarbons followed by separating the resulting reaction control diluent/hydrocarbon phase and recovering the reaction control diluent from said phase, with the proviso that the melting point of the pure reaction control diluent must be at or below the catalyst system reaction temperatures.

2. The process of recovering diphenyl ether reaction control diluent from a spent, essentially anhydrous cuprous chloride catalyst which has been used for dimerizing acetylene to monovinylacetylene wherein the resulting immiscible reaction control diluent phase containing tarry by-products is diluted with a tar precipitating amount of pentane followed by separating the resulting reaction control diluent/hydrocarbon phase and recovering said diphenyl ether reaction control diluent from said phase.

3. The process of claim 2 wherein the ratio of pentane to diphenyl ether is within the range of about 2:1 to 0.5:1.

References Cited

UNITED STATES PATENTS 2,857,435   10/1958   Gonzalez _____ 260—616

BERNARD HELFIN, *Primary Examiner.*

U.S. Cl. X.R.

260—678, 611, 616